United States Patent

Van Buskirk et al.

Patent Number: 5,639,814
Date of Patent: Jun. 17, 1997

[54] TEMPORARY PROTECTIVE COATING COMPOSITIONS CAPABLE OF LOW TEMPERATURE DRYING

[75] Inventors: Ellor J. Van Buskirk, McCandless Township; Rudolf Maska, Indiana Township, both of Pa.

[73] Assignee: PPG Industries, Inc., Pittsburgh, Pa.

[21] Appl. No.: 552,653

[22] Filed: Nov. 3, 1995

Related U.S. Application Data

[63] Continuation of Ser. No. 767,434, Sep. 30, 1991, abandoned, which is a continuation-in-part of Ser. No. 574,717, Aug. 30, 1990, abandoned, which is a continuation-in-part of Ser. No. 481,267, Feb. 20, 1990, abandoned, which is a division of Ser. No. 415,509, Oct. 2, 1989, Pat. No. 5,081,174, which is a continuation-in-part of Ser. No. 255,286, Oct. 11, 1988, Pat. No. 4,942,193.

[51] Int. Cl.$^6$ .................. C08L 91/06; C08L 33/06; C08K 5/05
[52] U.S. Cl. .................. 524/389; 524/560; 524/487
[58] Field of Search .................. 524/487, 560, 524/389

[56] References Cited

U.S. PATENT DOCUMENTS

| | | | |
|---|---|---|---|
| 4,013,607 | 3/1977 | Dwyer et al. | 260/29.6 H |
| 4,168,255 | 9/1979 | Lewis et al. | 524/277 |
| 4,289,671 | 9/1981 | Hernandez | 260/28.5 AV |
| 4,317,755 | 3/1982 | Gregory | 524/276 |
| 4,390,436 | 6/1983 | Hernandez | 252/49.3 |
| 4,540,736 | 9/1985 | Herten et al. | 524/556 |
| 4,562,226 | 12/1985 | Coombes et al. | 524/767 |
| 4,693,909 | 9/1987 | Ziegler et al. | 427/156 |
| 4,826,902 | 5/1989 | Hanabata et al. | 524/524 |
| 4,942,193 | 7/1990 | Van Buskirk et al. | 524/276 |
| 5,081,174 | 1/1992 | Van Buskirk | 524/277 |

FOREIGN PATENT DOCUMENTS

WO90/01051 2/1990 WIPO.

*Primary Examiner*—Joseph L. Schofer
*Assistant Examiner*—Wu C. Cheng
*Attorney, Agent, or Firm*—Dennis G. Millman

[57] ABSTRACT

A formable, weldable, temporary, protective coating for use on metals is provided comprising a neutralized acid- or base-functional polymer, lubricant, and solvent including water and an alcohol having no more than four carbon atoms per molecule, whereby the coating is capable of rapid drying at relatively low temperatures while exhibiting a flash point above 100° F.

10 Claims, No Drawings

TEMPORARY PROTECTIVE COATING COMPOSITIONS CAPABLE OF LOW TEMPERATURE DRYING

This is a continuation of application Ser. No. 07/767,434, filed Sep. 30, 1991, now abandoned, which was a continuation in part of application Ser. No. 07/574,717 filed Aug. 30, 1990, now abandoned, which was a continuation in part of application Ser. No. 07/481,267 filed Feb. 20, 1990, now abandoned, which was a divisional of application Ser. No. 07/415,509 filed Oct. 2, 1989, now U.S. Pat. No. 5,081,174, which was a continuation in part of application Ser. No. 07/255,286 filed Oct. 11, 1988, now U.S. Pat. No. 4,942,193.

BACKGROUND OF THE INVENTION

The present invention relates to temporary protective coating compositions which are useful in passivating untreated metallic substrates. More specifically, the invention relates to aqueous temporary protective coatings having solution polymerization solvents that may be rapidly evaporated at relatively low drying temperatures and yet do not create a fire hazard due to low flash point of the composition.

Passivation of metallic substrates in mills is typically done with mill oils or chemical treatments in order to prevent or reduce corrosion, particularly white rust. Usually passivating agents are removed after the metallic substrates are formed into a part. Mill oils are difficult to remove and less than desired corrosion protection is provided thereby. Chemical treatments, particularly those involving film-forming materials, are usually incompatible with other materials and processes that are subsequently applied to the subject metallic substrates.

Art-related protective coating compositions comprising alkali-soluble carboxyl group-containing polymers and/or waxes are known in the art. However, most of these compositions are employed distinctly on painted or polished surfaces and are less effective on untreated metallic substrates. In contrast, the protective coating compositions which are of interest here should be suited to the application to untreated metallic substrates. Additionally, these protective coating compositions should be compatible with the subsequently applied materials and processes. Moreover, the passivated metallic substrates should be formable and weldable and cleanable with an aqueous alkaline solution, and should be corrosion resistant. These types of temporary protective coating compositions are provided by the inventions in the related application identified above.

The aqueous, polymeric, temporary protective coatings of the related applications employ organic solvents to carry out the preferred method of solution polymerization. The organic solvent component of the temporary coating composition must be volatile in order to be evaporated quickly from the coating so as to permit rapid drying after application onto the metal surface. Coating compositions of this type that include common solvents such as propylene glycol monomethyl ether and ethylene glycol monobutyl ether attain optimum coating properties when baked at temperatures in the range of 300° F. to 450° F. For the application of temporary coatings to moving steel strips, it would be desirable for the bake temperatures to be considerably lower, such as on the order of 200° F. to 250° F. (peak metal temperature).

It is also desirable that the solvents in temporary coatings of this type impart to the coating composition a relatively high flash point so as to reduce any fire hazard associated with the liquid compositions. Substances having flash points above 100° F. are generally considered safe with regard to fire hazard, and it would be desirable for temporary coating compositions of the type involved here to exhibit that characteristic. However, attaining this objective is normally at odds with the objective of selecting solvents to provide rapid drying. It is also desirable that solvents meet the requirements of the solution polymerization process.

U.S. Pat. No. 5,006,578 (Masuda et al.) discloses polymerization of an acrylic resin in isopropanol for use in a temporary protective coating. The isopropanol is stripped from the resin prior to formulation of the coating composition. A lubricant such as wax is not included in the composition disclosed in the patent.

SUMMARY OF THE INVENTION

The present invention comprises an improvement in formable, weldable, aqueous, temporary protective coating compositions for metallic substrates. Such compositions comprise a combination of a neutralized acid- or base-functional polymer and a lubricating composition in an amount sufficient to provide drawability and formability of the metallic substrate to which it was applied, and the improvement comprises the use as the polymerization solvent alcohols having no more than four carbon atoms. Such low molecular weight alcohols are satisfactory solvents for solution polymerization to make the polymers of the coating compositions, and they evaporate rapidly from the coatings so as to permit relatively low drying temperatures, preferably less than 250° F. However, relatively volatile alcohols of this category, all having flash points below 100° F., would not appear to be suitable for use in compositions for which it is desired to avoid the flammability hazard of low flash points. But it has been found surprisingly that when alcohols having less than four carbon atoms are used in the aqueous coating compositions of the present invention the flash points of the coating compositions are substantially above 100° F., which is considered generally safe from flammability hazards.

Preferred examples of the low molecular weight solvents that may be used in the present invention are ethanol and propanol.

DETAILED DESCRIPTION OF THE INVENTION

In one coating composition of the invention, there is employed a base-neutralized acid-functional polymer. The acid-functional polymer is prepared by solution polymerization of ethylenically unsaturated monomer(s), at least one of which is acid functional; preferably, the polymerization is in the presence of a lubricating composition such as a hydrocarbon wax. The solution polymerization step is carried out in a solvent comprising an alcohol having no more than four carbon atoms. The resultant product is dispersed in water in the presence of a base such as ammonium hydroxide.

Examples of solvents that may be used as the solvent in the solution polymerization step in accordance with the present invention are: methanol, ethanol, 1-propanol, isopropanol, 1-butanol, 2-butanol, 2-methyl-l-propanol, and 2-methyl-2-propanol. Solvent grade ethanol with denaturing additives is suitable for use in the present invention.

When applied as a passivating agent, the protective coating composition, in the preferred embodiment, is found to produce a coating which is corrosion resistant, drawable, formable, weldable, and easily removable with an aqueous alkaline or acidic solution.

The term "formable" or "formability" is defined as the ability of a coated sheet of metal to be bent without creating substantial cracks or voids in the film. The term "drawable" or "drawability" is defined as the ability to stamp a coated sheet of metal into a curved three-dimensional shape without substantially breaking the sheet and without causing significant damage to the coated sheet of metal. The term "weldable" or "weldability" is defined as the ability to perform a sequence of spot welds on a coated sheet of metal using a conventional spot welding tip and pressure without substantial attendant problems of no welds, charting or cracking. As would be realized, the above properties can be affected by the nature of the selected sheet (panel) of metal. For many typical applications the protective coating composition of this invention shows remarkable improvement in the aforestated properties.

The acid- or base-neutralized, functional polymer that is employed herein has a Tg of about −30° C. to 100° C. Typically, the Tg is about −30° C. to 45° C. and preferably about −15° C. to 30° C. Weight average molecular weight of the polymer can be about 3,000 to 100,000 and preferably about 30,000 to 60,000. Typically, the polymer is a solution polymerized free-radical addition polymer. The polymer can be acid or base functional. In accordance with this invention, the acid-functional polymer can be prepared by addition polymerizing in an alcohol solvent medium, ethylenically unsaturated monomer(s) at least one of which is an acid-functional monomer. Examples of the acid-functional monomers can be acrylic acid, methacrylic acid, crotonic acid, itaconic acid, maleic acid, and the like. An amount of about 5 to 100 percent by weight of the acid-functional monomer based on the total monomer content can be employed. Typically, an amount of about 10 to 40 and preferably about 10 to 30 percent by weight is employed. A copolymerizable ethylenically unsaturated monomer such as a vinyl monomer, e.g., styrerie, vinyl toluene and the like, esters of acrylic or methacrylic acid, such as methyl methacrylate, butyl acrylate, and 2-ethylhexylacrylate, can be employed.

The base-functional polymer can be prepared by polymerizing, in a solvent medium, ethylenically unsaturated monomers, at least one of which is a base-functional monomer. Examples of the base-functional monomers can be amino alkyl(meth)acrylate, t-butyl aminoethyl(meth)acrylate, diisobutylaminoethyl(meth)acrylate, and dimethyl aminoethyl(meth)acrylate. An amount of about 1 to 50 and preferably about 5 to 20 of the base-functional monomers can be employed.

The lubricating material useful herein is believed to impart the property of drawability to the protective coating compositions. Hence, the lubricating material is employed in an amount sufficient to provide drawability of a substrate having thereon the coating of this invention. The lubricating material can contain a wax, and in the preferred embodiment of the invention, the lubricating material consists essentially of a wax. Suitable waxes include hydrocarbon waxes of varying melting points and grades, e.g., bees wax, carnauba wax, petrolatum wax and a mixture thereof. An example of a particularly suitable wax has a melting point of about 140° F. The lubricating composition can be employed in an amount ranging from about 5 to 70 and preferably about 5 to 20 percent by weight, based on the total weight of the lubricating composition and the polymer. The lubricating material may also be comprised of silicone fluid, molybdenum disulfide, graphite, hydrocarbon oil, vegetable oil, fatty acid, and/or resinous adjuncts. In the preferred embodiment wherein the polymer is prepared in the presence of the lubricating composition such as a wax, it is believed, without being bound thereby, that a partial graft of the polymer and the lubricating composition can be formed. With the low temperature boiling point alcohols used as solvents in the present invention, it is possible for polymerization to be carried out at temperatures below that at which significant grafting is believed to take place. In such a case, it is desirable to carry out the polymerization above the melting point of the wax to avoid coagulation. It should, however, be realized that a polymer can be made in the absence of a lubricating composition and then employed in combination with a lubricating composition, preferably in the form of a powder or liquid.

In one embodiment of the invention graphite is employed as an additive that enhances conductivity of the applied protective coating composition during welding. The additive is usually employed in a particulate form, in an amount sufficient to effect welding of a film of the composition which is of a relatively higher coating weight of about 1.5 milligrams per square inch or higher.

Following polymerization, the protective coating composition can be prepared by thinning the acid-neutralized or base-neutralized solution polymer containing a lubricating composition in water to a conducive application viscosity. This can be done by at least partially neutralizing the functional polymer, preferably with a volatile neutralizing agent. By the term "volatile" is meant that the neutralizing agent leaves the applied coating when it is dried or baked. Neutralization can be conducted before or during the thinning. For an acid-functional polymer, neutralization is effected with a base. Illustrative examples of the bases can be ammonia, including ammonium hydroxide, and amines, e.g., ethanolamine, diethanolamine, N-methylethanolamine, dimethylethanolamine, methylamine, ethylamine, triethylamine and morpholine. For a base-functional polymer, neutralization can be effected with an inorganic or organic acid such as acetic acid, formic acid, lactic acid, sulfamic acid or the like.

Other additives, such as a defoamer, a wetting agent, or a solvent, may be employed herein. It is, however, a distinct feature of this invention that the protective coating compositions can be free of or substantially free of an external surfactant which can cause water sensitivity and poor corrosion resistance.

In the practice of the invention, the protective coating composition can be applied to a metallic substrate by a conventional method such as spraying, brushing, dipping, roller coating, flow coating, curtain coating or the like or by electrodeposition. A coating weight of about 0.2 to 6, preferably 0.3 to 4, more preferably about 0.5 to 3, and most preferably about 1.0 to 2.0 milligrams per square inch can be applied. It would, of course, be realized that substrates with a different surface roughness and porosity may require a different coating weight of the protective coating composition. It has been found advantageous to apply the coating composition onto the substrate to be protected such that the coating weight in milligrams per square inch equals or is less than $(3.26-0.0253T_g)$. Coating weight in milligrams per square inch is alternately referred to by the term film weight or film thickness; Tg is in degrees centigrade (° C.).The applied coating can be air dried or forced dried or baked in a remarkably short period of time. The resultant coating has been found to be block resistant, i.e., the coated substrates are resistant to sticking together when stacked.

Removal of the applied coating is easily effected by contacting the coated substrate with an aqueous alkaline or acidic solution. "Contacting" means such spraying, flooding, dipping (immersion) or the like can be employed. It is noteworthy that, in actual production practice, a conventional lubricating composition is not satisfactorily removed from inside an enclosed portion of a manufactured article which is not exposed to the direct impingement of a sprayed cleaner. In contrast, the coatings of this invention, including the lubricating compositions, are removed from substantially all areas including the enclosed areas by immersion thus enabling proper pretreatment of all areas of an article when desired. Consequently, adhesion of a subsequently applied paint layer is significantly improved. It is, therefore, a distinct feature of the invention that the protective coatings of this invention can be removed effectively by immersion cleaning at ambient temperatures.

The concentration of the alkaline or acid removing solution will depend, for example, on the nature of the particular alkali or acidic solution and its temperature of removal. With the protective coating removed therefrom, the substrate can be used as such, or subjected to other coating processes such as conversion coating.

Since it is relatively easy to remove the protective coating composition of this invention, it is believed that the composition may be employed by itself or with a mill oil applied thereon, preferably in a relatively low amount. The combination of the protective coating and the mill oil will be removable, drawable, formable, weldable and corrosion resistant.

With the combination of the protective coating and the mill oil removed therefrom, the substrate, here again, can be used without further treatment or subjected to subsequent coating processes.

The following Examples I through III relate to the resin synthesis, coating formulation, and performance of a specific embodiment of the invention using a short chain alcohol as a polymerization solvent.

EXAMPLE I

A reaction vessel equipped with a thermometer, stirrer, dropping funnels, reflux condenser and means for maintaining a blanket of nitrogen was charged at room temperature with a composition consisting of a mixture of 56.3 grams of deionized water, 181.3 grams of ethanol, and 81 grams of SHELLMAX (a petroleum wax having a softening point of about 60° C., available from Shell Oil Company). (The ethanol used in this and all of the examples herein included 4.4 percent by weight methanol, 0.93 weight percent methyl isobutyl ketone, and 4.47 weight percent ethyl acetate as denaturants, and 6.48 percent by weight water.) The composition was heated over a period of about 35 minutes to reflux. When the reflux temperature was attained (78° C.), a simultaneous, gradual addition to the vessel of Charge A (described below) and Charge X (described below) was started and continued for three hours while maintaining reflux. Charge A consisted of a mixture of 648 grams of butyl acrylate, 216.0 grams of styrene, and 216.0 grams of acrylic acid. Charge X consisted of a mixture of 50.0 grams of ethanol and 37.8 grams of azobis-2,2'-(2-methylbutyronitrile). When the addition of Charges A and X was completed at 85° C., 17.5 grams of ethanol was added as a rinse for Charge A. Charge B comprising 10.0 grams of ethanol and 3.7 grams of t-amylperoxy-2-ethyl hexanoate was added, and the reaction mixture was held for one hour. At this point, the viscosity of the resin measured as a 50/50 mixture of resin and m-pyrol was V+ Gardner-Holdt at 38.6 percent solids. Charge C consisting of 141.0 grams of deionized water was added and the reaction mixture was cooled to 74° C. Charge D comprising 180.0 grams of deionized water and 90.0 grams of ammonium hydroxide (282 $NH_3$ solution in water) was added over 15 minutes and held for 15 minutes. Charge E comprising additional 1600 grams of deionized water was added to the reaction mixture over 90 minutes at a temperature of 76° C. to 73° C., followed by cooling. Milliequivalents of acid was 0.80 per gram, and milliequivalents of base was 0.43 per gram. Weight average molecular weight (Mw) was 40,500. Viscosity was 2835 centipoises (Brookfield No. 3 spindle) at 20 revolutions per minute. The pH was 6.96 and percent solids was 32.0 (measured at 110° C. for one hour).

EXAMPLE II

A sample of the composition of Example I was adjusted to a pH of 7.53 with aqueous ammonia solution and thinned with deionized water to 24.7% weight solids and a viscosity of 38 seconds with a No. 4 Ford cup. When tested for flash point by the Pensky-Martens Closed Cup Flash Point method found in ASTM D93, the flash point was found to be 115° F.

EXAMPLE III

Another sample of the composition of Example I was adjusted to a pH of 7.26 with aqueous ammonia solution and thinned with deionized water to 25.4% weight solids and a viscosity of 24 seconds with a No. 2 Zahn cup. This adjusted composition was applied by a No. 5 wire-wound drawbar to a freshly cleaned electrogalvanized steel panel, baked for 17 seconds at 446° F. to a peak metal temperature of 200° F. and quickly cooled by applying water to the back of the panel. A film weight of 1.79 milligrams per square inch resulted. The test panel was exposed to 100% relative humidity at 100° F. for four days, after which a slight amount of blushing was observed at the top third of the panel, and a trace of blushing was observed on the bottom ⅔ of the panel. This coated sheet was immersed in a commercial alkaline cleaner (Chemkleen 49 from PPG/Chemfil Corporation, Troy, Mich.) for 30 seconds at 120° F. and rinsed in tap water. The cleaned panel was observed to be 100% water break free, meaning that tap water spreads evenly over the surface and does not bead up.

The following example demonstrates the disadvantage of using a polymerization solvent outside the scope of the present invention.

COMPARATIVE EXAMPLE IV

Substantially the same polymeric product resulting from the steps described in Example I was produced, except that methyl ethyl ketone was used in place of ethanol. The composition was adjusted to a pH of 7.46 with aqueous ammonia and thinned with deionized water to a viscosity of 37 seconds with a No. 4 Ford cup at 24.5 weight percent solids. The flash point of this coating composition as measured by the Pensky-Martens Closed Cup Flash Point method was found to be 48° F. This is an undesirably low flash point.

The use of a relatively low flash point solvent such as methyl ethyl ketone as in Example IV would be permitted during the polymerizing step of the present invention if the solvent were to be stripped from the composition thereafter. The viscosity of the composition could then be adjusted using the low molecular weight alcohols of the present invention.

An advantageous relationship between glass transition temperature of the resin ($T_g$) and coating weight for the claimed temporary protective coating has been observed. For marginally acceptable weldability, coating weight in milligrams per square inch equals or is less than (3.26-0.0253$T_g$). For the typically acceptable weldability, coating weight in milligrams per square inch equals or is less than (2.3-0.0195$T_g$).

The following example demonstrates the weldability of an embodiment of the present invention.

EXAMPLE V

Resin preparation: A reaction vessel equipped with a thermometer, stirrer, dropping funnels, reflux condenser and means for maintaining a blanket of nitrogen was charged at room temperature with a composition consisting of a mixture of 200.0 grams of isopropanol and 45 grams of SHELL-MAX (a petroleum wax having a softening point of about 60° C., available from Shell Oil Company). The composition was heated over a period of 25 minutes to reflux. When reflux temperature (82° C.) was attained, a simultaneous, gradual addition to the vessel of Charge A and Charge X was started and continued for three hours while maintaining reflux. Charge A consisted of 180.0 grams of acrylic acid, 180.0 grams of styrene, and 540.0 grams of butyl acrylate, and Charge X consisted of a mixture of 9.0 grams of isopropanol and 27.0 grams of t-amylperoxy-2-ethyl hexanoate. When the addition of Charges A and X were completed at 96° C., 31.5 grams of isopropanol was added as a rinse for Charge A. Charge B consisting of 3.1 grams of isopropanol and 3.1 grams of t-amylperoxy-2-ethyl hexanoate was added, and the reaction mixture was held for one hour. A 50/50 mixture of m-pyrol and the reaction product at this point had a T Gardner-Holdt viscosity at 40.7 percent solids. Charge C consisting of 117.0 grams of deionized water was then added. The reaction mixture was then cooled to 90° C. Charge D comprising 150.0 grams of deionized water and 75.8 grams of ammonium hydroxide (as 28% NH$_3$ solution in water) was added over 15 minutes and held for 15 minutes. Charge E comprising an additional 2070.0 grams of deionized water was added to the reaction mixture over 90 minutes at a temperature of 63° to 52° C. followed by cooling. Milliequivalents of acid was 0.668 per gram, milliequivalents of base was 0.332 per gram, weight average molecular weight (Mw) was 29,816, viscosity was 90 centipoises (Brookfield #3 spindle) at 20 revolutions per minute, pH was 6.99, and percent solids was 25.9 (measured at 110° C. for one hour).

Coating formulation: To 264.5 grams of the above resin was added 1.37 grams of "Foamaster 0," a defoamer available from Henkel Corporation, 14.0 grams of 5% ammonia solution, 25 grams of deionzed water, and 1.2 grams of a solution containing 6.38% "Proxel BD," a biocide available from ICI Specialty Chemicals of Wilmington, Del. This composition had a calculated solids content of 22.4%, and a viscosity of 28 seconds through a #2 Zahn cup. To 100 grams of this liquid formulation was added 0.84 grams of an ammonium phosphate solution having a concentration of 5.2% as phosphoric acid. This addition is made to limit the interaction between the wet coating and zinc containing substrates.

Coating application: Oily steel panels approximately 0.030 inches thick coated with a protective metal coating of zinc/iron, referred to as electrozinc-iron, were spray cleaned with a solution of "Chemkleen 49" (an alkaline cleaner available from the Chemfil subsidiary of PPG Industries) for 15 seconds at 150° F., rinsed, and squeegee dried. The coating composition formulated above in this Example was applied by a #5 drawbar to one side of the cleaned panels and baked for 12 seconds at 500° F. air temperature to a peak metal temperature of 190°–200° F. After air cooling, the other side of the steel was coated with the same composition and drawbar, and the panel baked for 19 seconds at 500° F. temperature to a peak metal temperature of 250° F. After baking, a stream of water was applied to one side of the panel to quickly cool it.

Welding tests: A pedestal type welder (Model 150AP from Lots Corporation of Union, N.J.) was used to test the weldability of the panels with the temporary coating of this Example. The air piston of the welder provided a theoretical force of 450 pounds at the welding tips with a tip geometry known as "A caps" made of class 2 copper alloy with a face diameter of ¼ inch. The electrodes were mounted in a spring cushioned device to reduce impact of the welding tips onto the coated sheets, and the electrodes were positioned 0.5 inch apart. The following weld timing cycles were used: 50 cycles (or 50/60 second) of squeeze time between activation of the air piston and the starting of welding current, 8 cycles (8/60 second) of welding current, and 6 cycles (6/60 second) of hold time after the completion of welding current. The squeeze timing of 50 cycles is relatively short for a pedestal welder, and results in approximately 90% of nominal force being applied at the start of the welding current. Using a current setting of 94 percent and a tap setting (which regulates welding voltage between 4 and 6 volts) of 4, approximately 9,000 amps of welding current resulted. Eighteen pairs of 2×2 inch squares of the coated panels were gripped together with a clamp usually used for attaching ground wires to 55 gallon drums and spot welded with one weld. This gripping by the clamp is thought to assist in spot welding through paint films by providing a small amount of shunting current at the start of the weld. All eighteen pairs of coupons welded with what is considered normal behavior. Charring or the prevention of current flow did not occur.

The following example demonstrates the drawability of an embodiment of the present invention.

EXAMPLE VI

Resin preparation: A reaction vessel equipped with a thermometer, stirrer, dropping funnels, reflux condenser, and means for maintaining a blanket of nitrogen was charged at room temperature with a composition consisting of a mixture of 46.9 grams of deionized water, 170.0 grams of isopropanol, and 135 grams of SHELLMAX (a petroleum wax having a softening point of about 60° C., available from Shell Oil Company). The composition was heated over a period of 35 minutes to reflux. When reflux temperature (81° C.) was attained, a simultaneous, gradual addition to the vessel of Charge A and Charge X was started and continued for three hours while maintaining reflux. Charge A consisted of 180.0 grams of acrylic acid, 270.0 grams of styrene, and 450.0 grams of butyl acrylate, and Charge X consisted of a mixture of 9.0 grams of isopropanol and 27.0 grams of t-amylperoxy-2-ethyl hexanoate. When the addition of Charges A and X were completed at 89° C., 14.6 grams of isopropanol was added as a rinse for Charge A, Charge B consisting of 3.1 grams of isopropanol and 3.1 grams of t-amylperoxy-2-ethyl hexanoate was added, and the reaction mixture was held for one hour. The reaction product at this point in a 50/50 mixture with m-pyrol had an X+ Gardner-Holdt viscosity at 41.1 percent solids. Charge C consisting of 117.0 grams of deionized water was then added and the reaction mixture cooled to 74° C. Charge D comprising 150.0 grams of deionized water and 75.8 grams of ammonium hydroxide (as 28% NH$_3$ solution in water) was added over 15 minutes and held for 15 minutes. Charge E comprising an additional 2070 grams of deionized water was added to the reaction mixture over 90 minutes at a temperature of 66° to 49° C., followed by cooling. Milliequivalents of acid was 0.650 per gram, milliequivalents of base was 0.235 per gram, weight average molecular weight (Mw) was 45,085, viscosity was 35 centipoises (Brookfield #3 spindle) at 20 revolutions per minute, pH was 7.07, and percent solids was 27.6 (measured at 110° C. for one hour).

Coating preparation: To 618 grams of the resin prepared above in this Example was added 3.4 grams of "Foamaster 0," a defoamer available from Henkel Corporation, 35.1 grams of a 5% ammonia solution, 20 grams of deionized water, and 2.8 grams of a solution containing 6.38% "Proxel BD" biocide available from ICI Specialty Chemicals of Wilmington, Del. This composition had a calculated solids content of 25.3%, and a pH of 7.86. 100 grams of this composition was diluted with 5 grams of deionized water to a viscosity of 27 seconds through a #2 Zahn cup.

Coating application: Oily electrogalvanized steel panels approximately 0.030 inches thick were spray cleaned with a solution of "Parco 338" (available from Parker+Amchem Corporation) for 25 seconds at 150° F., rinsed, and squeegee dried. The coating composition formulated above in this Example was applied with a #5 drawbar (which results in a dried film weight of approximately 1.5 milligrams per square inch) to one side of each of the cleaned electrogalvanized steel panels and baked for 15 seconds at 446° F. air temperature to a peak metal temperature of 190° F. After air cooling, the other side of the panel was coated with the same composition and drawbar, and the coated panel was baked for 25 seconds at 446° F. air temperature to a peak metal temperature of 250° F. After baking, a stream of water was applied to one side of the panel to quickly cool it.

Stamping test: To test drawability and formability (fabrication) and cleanability, panels coated as described above in this Example were drawn into square cups one inch in height and 1 7/16 inches along each side. One area on the sides of the cups was deformed to a major strain of +20 percent and a minor strain of −12 percent. Another area on the sides of the cups was deformed to a major strain of +60 percent and a minor strain of −35 percent. The corners of the cups were deformed to a major strain of +160 percent and a minor strain of −40 percent. After the cups were stored for one week at 120° F. storage temperature, one group of the cups was tested for removability with a 1% "Chemkleen 49" solution at 120° F. The cups were 100% water break free and clean after immersion cleaning for one minute in the 1% "Chemkleen 49" solution and rinsing. Another set of the cups that had been stored for one week at 120° F. were phosphated using a "Chemkleen 49" cleaning solution and "Chemfos 168" phosphating solution. "Chemfos 168" is available from the Chemfil division of PPG Industries, Troy, Mich. After phosphating, the cups showed a dark, uniform deposit of phosphate pretreatment over the entire area. The phosphate pretreatment on the sides of the cups showed a slight scraping pattern from the stamping operation. The amount of scraping and the visual appearance of the phosphated cups indicated that excellent stamping behavior had been achieved by the composition of the present invention.

While the invention has been described with particularity, it will be understood that various modifications will be apparent to one skilled in the art without departing from the scope or spirit of the invention. Accordingly, it is intended that the claims directed to the invention be construed as encompassing all aspects of the invention which would be treated as equivalents by those skilled in the art to which the invention pertains.

What is claimed is:

1. An aqueous, temporary, protective coating composition for application onto metal surfaces comprising:

a solution-polymerized, neutralized, acid- or base-functional polymer;

a lubricating material in an amount of about 5 to 70 percent by weight based on total solids of the composition sufficient to provide drawability of metal onto which it is applied; and solvent including water and, as the major organic solvent, alcohol having no more than four carbon atoms per molecule;

whereby the composition has a flash point above 100° F.

2. The protective coating composition of claim 1 wherein the alcohol solvent portion is selected from the group consisting of ethanol and propanol.

3. The protective coating composition of claim 1 wherein the polymer is the reaction product of free-radical addition polymerization of ethylenically unsaturated monomers, at least one of which is acid-functional.

4. The protective coating composition of claim 3 wherein the acid-functional monomer is present in an amount of about 5 to 100 percent based on total monomer content of the monomers polymerized.

5. The protective coating composition of claim 3 wherein the acid-functional polymer is base-neutralized with a volatile amine.

6. The protective coating composition of claim 1 wherein the lubricating material is present in an amount of about 5 to 20 percent by weight.

7. The protective coating composition of claim 1 wherein the lubricating material consists primarily of wax.

8. The protective coating composition of claim 7 wherein the wax is selected from the group consisting of hydrocarbon wax, carnauba wax, bee's wax and a mixture thereof.

9. An aqueous, temporary, protective coating composition for application onto metal surfaces comprising:

a solution-polymerized, neutralized, acid- or base-functional polymer having weight average molecular weight no greater than 100,000;

a lubricating material in an amount of about 5 to 70 percent by weight based on total solids of the composition sufficient to provide drawability of metal onto which it is applied; and solvent including water and, as the major organic solvent, alcohol having no more than four carbon atoms per molecule;

whereby the composition has a flash point above 100° F.

10. The protective coating composition of claim 9 wherein the polymer has weight average molecular weight no greater than 60,000.

* * * * *